(12) United States Patent
Oyama

(10) Patent No.: US 6,773,000 B2
(45) Date of Patent: Aug. 10, 2004

(54) VIBRATION ISOLATION SPRING MOUNT

(75) Inventor: Mitsuhiro Oyama, Walnut, CA (US)

(73) Assignee: Tozen Sangyo Co., LTD, Saitama (JP)

( * ) Notice: Subject to any disclaimer, the term of this patent is extended or adjusted under 35 U.S.C. 154(b) by 0 days.

(21) Appl. No.: 10/091,082

(22) Filed: Mar. 6, 2002

(65) Prior Publication Data

US 2003/0168791 A1 Sep. 11, 2003

(51) Int. Cl.[7] ................................................. F16F 15/04
(52) U.S. Cl. ..................... 267/140.4; 267/136; 267/170
(58) Field of Search ............................... 267/69, 70, 71, 267/74, 134, 135, 136, 140.3, 140.4, 140.12, 170, 174, 178, 248, 249, 196, 216; 248/562, 565, 568, 569, 570, 622, 623, 638

(56) References Cited

U.S. PATENT DOCUMENTS 1,792,344 A * 2/1931 Wikander .................... 267/135
2,553,269 A * 5/1951 Oldofredi .................... 267/178
3,572,621 A * 3/1971 Whitten et al. ............. 267/178

FOREIGN PATENT DOCUMENTS

| JP | 8-121532 A | * | 5/1996 |
| JP | 8-210439 A | * | 8/1996 |
| JP | 9-53684 A | * | 2/1997 |

* cited by examiner

*Primary Examiner*—Thomas Williams
(74) *Attorney, Agent, or Firm*—Charles C. H. Wu; Wu & Cheung, LLP

(57) ABSTRACT

A vibration isolation spring mount is disclosed. A compression coil spring is inserted between an inner sleeve and an outer sleeve and a pair of pads are disposed on the inner sleeve and the outer sleeve. Outwardly extending blades disposed on the open end of the inner sleeve are inserted into the spaces defined by inwardly extending teeth disposed on the open end of the outer sleeve, then the blades are rotated relative to the teeth until the teeth and the blades impingingly engage due to the compressed compression coil spring biasing the teeth against the blades.

6 Claims, 4 Drawing Sheets

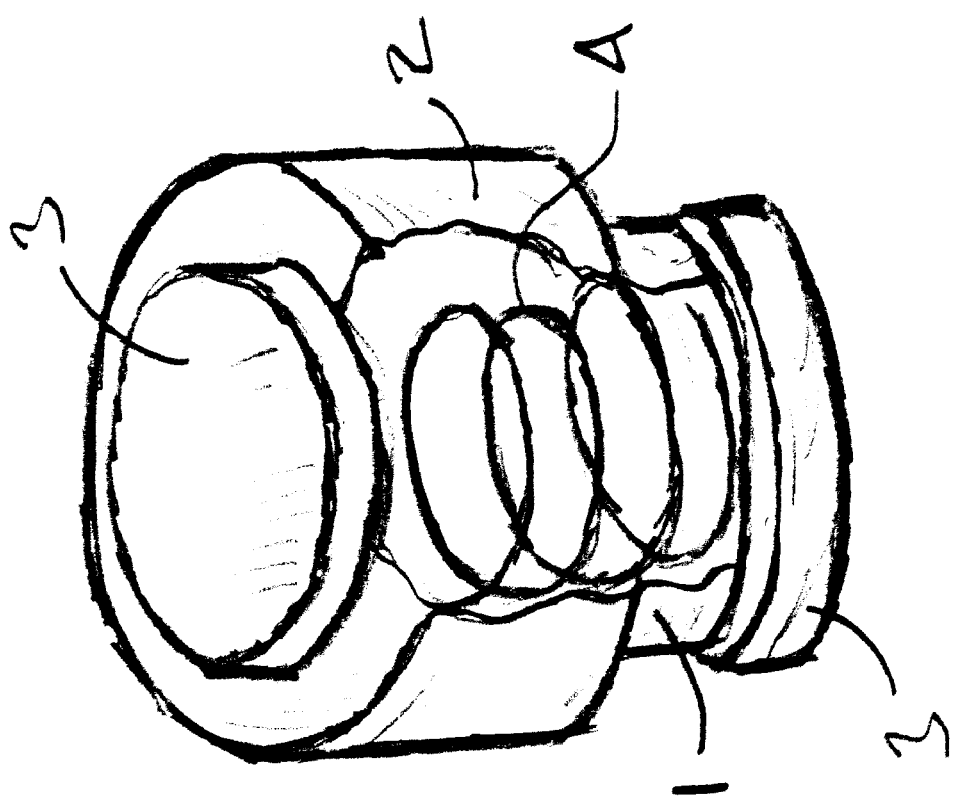

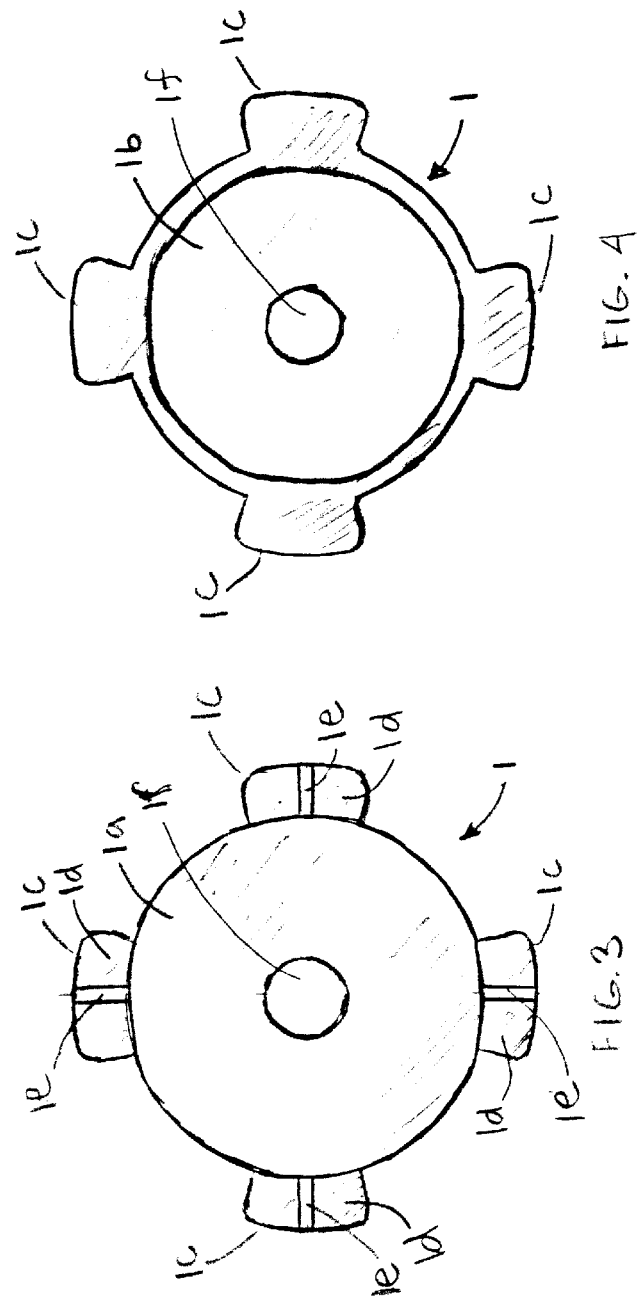

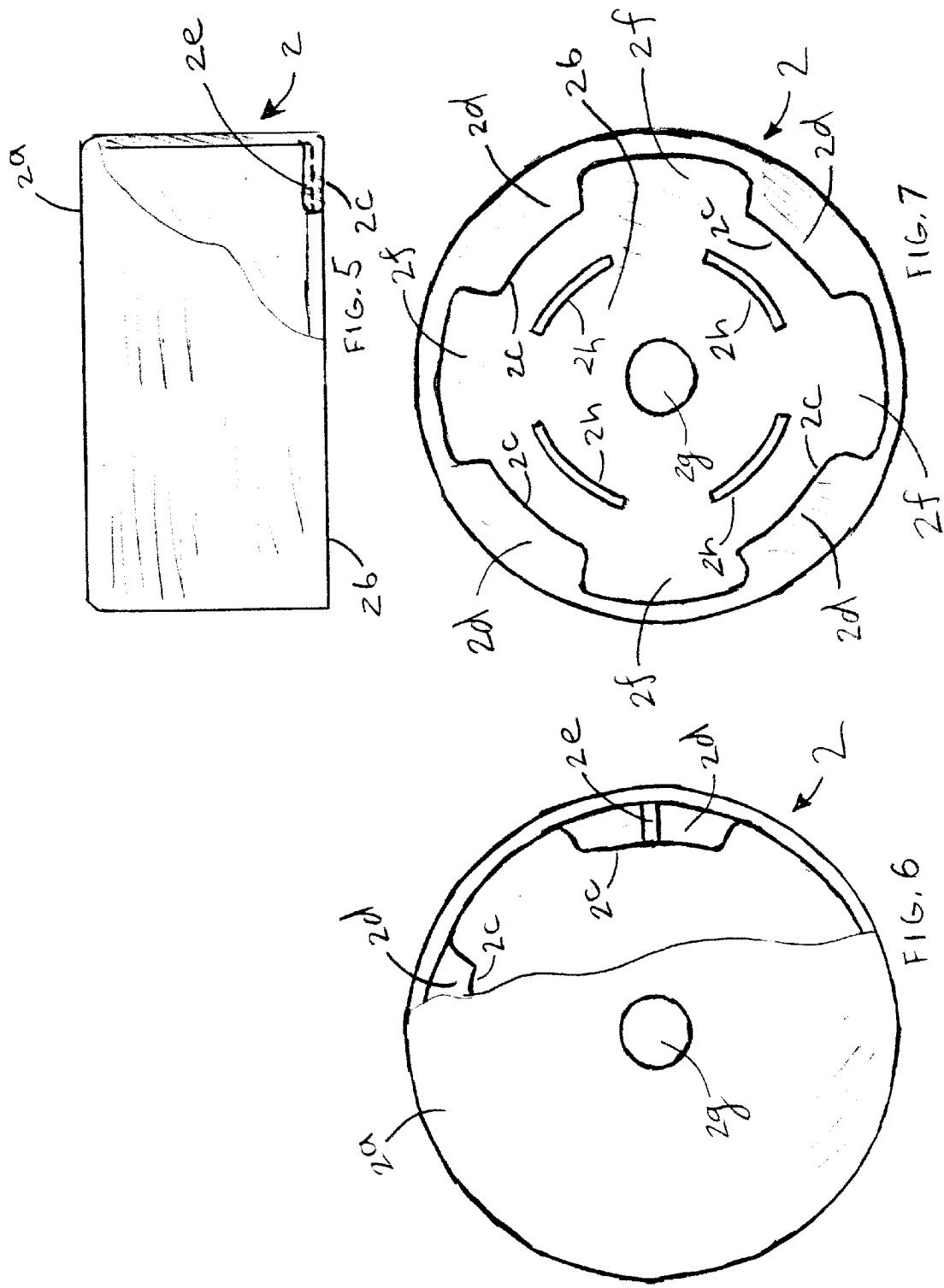

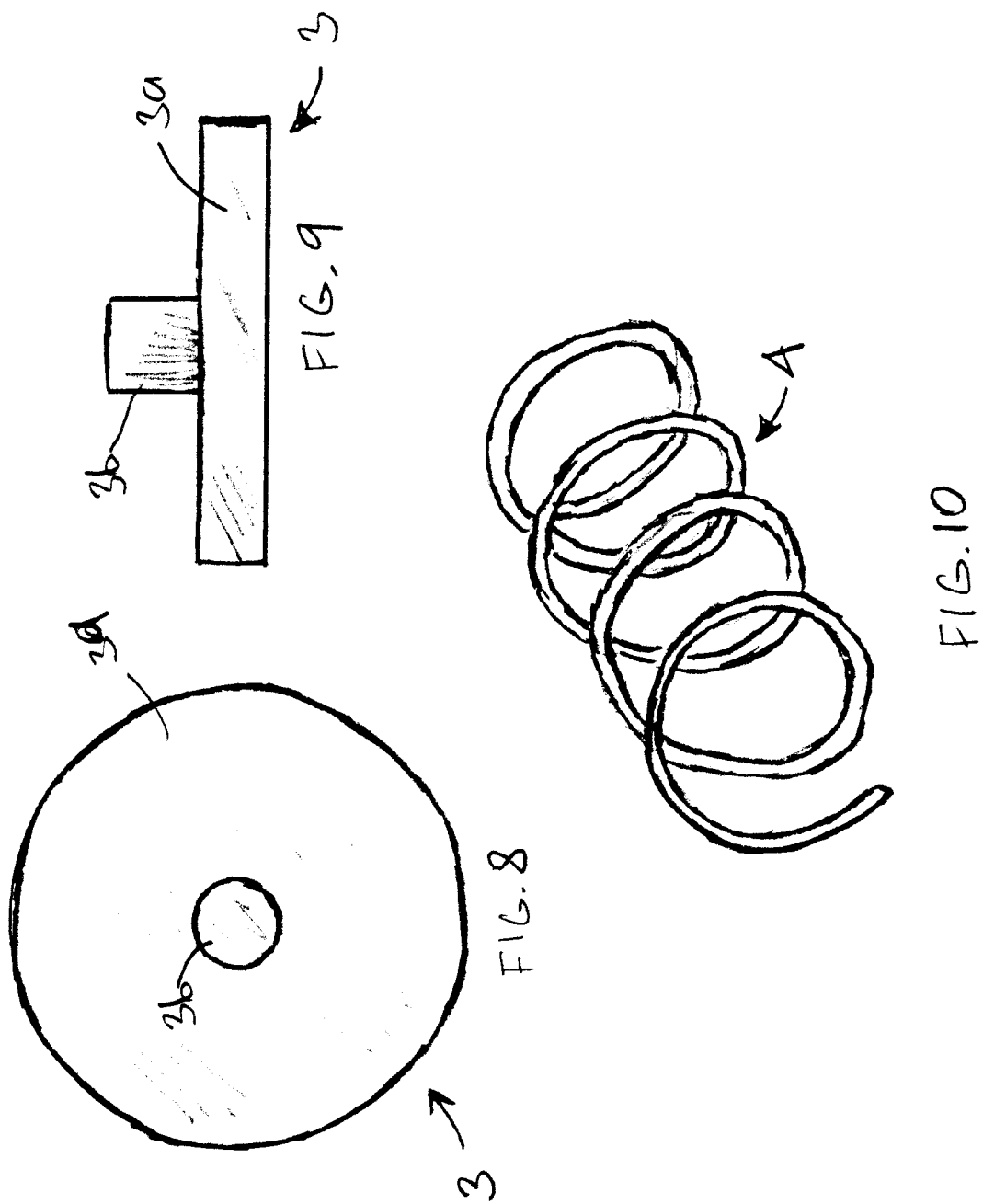

VIBRATION ISOLATION SPRING MOUNT

BACKGROUND OF THE INVENTION

This invention pertains to a vibration isolation spring mount. Many types of heavy industrial equipment, such as pumps, fans, refrigeration and air-conditioning units, and many others produce vibration that not only produces excessive noise, but over time may be damaging to the equipment and the premises where such equipment is housed. To eradicate this problem, it is desirable to isolate vibration by way of vibration isolation spring mounts placed underneath the equipment. Ideally, the vibration isolation spring mount must be durable and at the same time inexpensive to manufacture and simple to assemble.

SUMMARY OF THE INVENTION

The vibration isolation spring mount of the present invention is durable, inexpensive to manufacture and simple to assemble. It comprises a polypropylene cylindrical inner sleeve, a polypropylene cylindrical outer sleeve, a carbon steel compression coil spring inserted between the inner sleeve and the outer sleeve and a pair of synthetic rubber pads disposed on the inner sleeve and the outer sleeve. The open end of the inner sleeve is equipped with outwardly extending blades, whereas the open end of the outer sleeve is equipped with inwardly extending teeth. To assemble the vibration isolation spring mount of the present invention, the compression coil spring is inserted into the inner sleeve, which has an inside diameter for tight insertion of the compression coil spring, then the inner sleeve is inserted into the outer sleeve with its blades inserted into the spaces defined by the teeth of the outer sleeve, then the blades are rotated relative to the teeth until the teeth and the blades impingingly engage due to the compressed compression coil spring biasing the teeth against the blades. The pads are equipped with mounting knobs that are inserted into the openings provided in the closed ends of the inner sleeve and outer sleeve.

BRIEF DESCRIPTION OF THE DRAWINGS FIGURES

FIG. 1 shows a partially open isometric view of the vibration isolation spring mount of this invention;

FIG. 2 shows a side view of the inner sleeve;

FIG. 3 shows a bottom view of the inner sleeve;

FIG. 4 shows a top view of the inner sleeve;

FIG. 5 shows a side view of the outer sleeve;

FIG. 6 shows a top view of the outer sleeve;

FIG. 7 shows a bottom view of the outer sleeve;

FIG. 8 shows a top view of the pad;

FIG. 9 shows a side view of the pad;

FIG. 10 shows an isometric view of the pad.

DETAILED DESCRIPTION OF THE PREFERRED EMBODIMENT

This invention will be better understood with the reference to the drawing figures FIG. 1 through FIG. 10. The same numerals and letters refer to the same elements in all drawing figures.

Viewing FIG. 1, numeral 1 indicates an inner sleeve; numeral 2 indicates an outer sleeve; numeral 3 indicates a pad; numeral 4 indicates a compression coil spring. Compression Coil Spring 4 is inserted between Inner Sleeve 1 and Outer Sleeve 2. Inner Sleeve 1 is shaped as a cylinder with an inside diameter for tight insertion of Compression Coil Spring 4. Outer Sleeve 2 is also shaped as a cylinder. Each of Pad 3 has a cylindrical base, one Pad 3 is disposed on Inner Sleeve 1 and one Pad 3 is disposed on Outer Sleeve 2.

Viewing FIG. 2, FIG. 3 and FIG. 4, Inner Sleeve 1 comprises an enclosed lower end indicated by numeral 1a, an open upper end indicated by numeral 1b and four blades indicated by numeral 1c. Even though the number of Blades 1c in this preferred embodiment is four, this number can be different, as persons knowledgeable in the pertinent arts will recognize. Blades 1c are disposed along a circumference of Open Upper End 1a and extend radially outward in relation to Inner Sleeve 1. Blades 1c have blades contact surfaces indicated by numeral 1d. Blades Contact Surfaces 1d are perpendicular to the axis of Inner Sleeve 1 and face Enclosed Lower End 1a.

Each of Blades Contact Surfaces 1d comprises a projection indicated by numeral 1e. Projection 1e is oriented in the radial direction in relation to Inner Sleeve 1.

In this preferred embodiment, Inner Sleeve 1 is made of polypropylene. However, it can be made of other materials, as persons knowledgeable in the pertinent arts will recognize.

Viewing now FIG. 5, FIG. 6 and FIG. 7, Outer Sleeve 2 comprises an enclosed upper end indicated by numeral 2a; an open lower end indicated by numeral 2b and four teeth indicated by numeral 2c. Even though the number of Teeth 2c in this preferred embodiment is four, this number can be different, as persons knowledgeable in the pertinent arts will recognize. Teeth 2c are disposed along a circumference of Open Lower End 2b and extend radially inward in relation to Outer Sleeve 2. Teeth 2c have teeth contact surfaces indicated by numeral 2d. Teeth Contact Surfaces 2d are perpendicular to the axis of Outer Sleeve 2 and face Enclosed Upper End 2a.

Teeth 2c define spaces therebetween indicated by numeral 2f. Spaces 2f are for effecting insertion of Blades 1c in the axial direction, part-circular rotation between Blades 1c and Teeth 2c and impingingly engaging Blades Contact Surfaces 1d with Teeth Contact Surfaces 2d. Further, each of Teeth Contact Surfaces 2d comprises a bore indicated by numeral 2e. Bore 2e is oriented in the radial direction in relation to Outer Sleeve 2. Bore 2e is for receiving and engaging with Projection 1e.

Viewing FIG. 7, numeral 2h indicates four guide ribs. Guide Ribs 2h are disposed on an interior surface of Enclosed Upper End 2a. Guide Ribs 2h are for receiving and maintaining Compression Coil Spring 4 centered in relation to the axis of Outer Sleeve 2, said guide ribs. Even though the number of Guide Ribs 2h in this preferred embodiment is four, this number can be different, as persons knowledgeable in the pertinent arts will recognize. Further, in this preferred embodiment, Outer Sleeve 2 is made of polypropylene. However, it can be made of other materials, as persons knowledgeable in the pertinent arts will recognize.

Viewing FIG. 8 and FIG. 9, numeral 3a indicates a cylindrical base, numeral 3b indicates a mounting knob. Mounting Knob 3b is disposed in the center of Cylindrical Base 3a and extends axially outward in relation to Cylindrical Base 3a. Viewing now FIG. 3 and FIG. 4, numeral if indicates an opening. Opening if is disposed in the center of Enclosed Lower End 1a and is for insertion of and engagement by way of the force of friction with Mounting Knob 3b.

Similarly, viewing now FIG. 6 and FIG. 7, numeral 2g indicates an opening. Opening 2g is disposed in the center of Enclosed Upper End 2a and is for insertion of and engagement by way of the force of friction with Mounting Knob 3b.

In this preferred embodiment, Pad 3 is made of synthetic rubber. However, it can be made of other materials, as persons knowledgeable in the pertinent arts will recognize.

Viewing FIG. 10, there is shown Compression Coil Spring 4. In this preferred embodiment, Compression Coil Spring 4 is made of carbon steel. However, it can be made of other materials, as persons knowledgeable in the pertinent arts will recognize.

Viewing again FIG. 2, numeral 1g indicates a loading limit position indicator. Loading Limit Position Indicator 1g is disposed on the side of Inner Sleeve 1 and allows to gauge the position of Outer Sleeve 2 relative to Inner Sleeve 1 as Compression Coil Spring 4 is compressed and Inner Sleeve 1 moves farther inside Outer Sleeve 2 due to the weight applied to the vibration isolation spring mount of the present invention.

While the present invention has been described and defined by reference to the preferred embodiment of the invention, such reference does not imply a limitation on the invention, and no such limitation is to be inferred. The invention is capable of considerable modification, alteration, and equivalents in form and function, as will occur to those ordinarily skilled and knowledgeable in the pertinent arts. The depicted and described preferred embodiment of the invention is exemplary only, and is not exhaustive of the scope of the invention. Consequently, the invention is intended to be limited only by the spirit and scope of the appended claims, giving full cognizance to equivalents in all respects.

What is claimed is:

1. A vibration isolation spring mount comprising:
   (a) an inner sleeve;
   (b) an outer sleeve;
   (c) a compression coil spring inserted between said inner sleeve and said outer sleeve;
   (d) a pair of pads, one of said pads disposed on said inner sleeve and one of said pads disposed on said outer sleeve;
   (e) said inner sleeve shaped as a cylinder with an inside diameter for tight insertion of said compression coil spring, said inner sleeve comprising an enclosed lower end, an open upper end, a plurality of blades disposed along a circumference of said open upper end, said blades extending radially outward in relation to said inner sleeve and having blades contact surfaces perpendicular to the axis of said inner sleeve and facing said enclosed lower end;
   (f) said outer sleeve shaped as a cylinder and comprising an enclosed upper end, an open lower end, a plurality of teeth disposed along a circumference of said open lower end, said teeth extending radially inward in relation to said outer sleeve and having teeth contact surfaces perpendicular to the axis of said outer sleeve and facing said enclosed upper end, said teeth further defining spaces therebetween for effecting insertion of said blades in the axial direction, part-circular rotation between said blades and said teeth and impingingly engaging said blades contact surfaces with said teeth contact surfaces;
   (g) each of said pads comprising a cylindrical base and a mounting knob disposed in the center of said cylindrical base and extending axially outward in relation to said cylindrical base, each of said enclosed lower end and said enclosed upper end comprising an opening for insertion of and engagement by way of the force of friction with said mounting knob, said opening disposed in the center of each of said enclosed lower end and said enclosed upper end; and
   (h) each of said blades contact surfaces comprising a projection, said projection oriented in the radial direction in relation to said inner sleeve and wherein each of said teeth contact surfaces comprises a bore for receiving and engaging with said projection, said bore oriented in the radial direction in relation to said outer sleeve.

2. A vibration isolation spring mount as in claim 1, wherein said inner sleeve further comprises a loading limit position indicator.

3. A vibration isolation spring mount as in claim 2, wherein said inner sleeve and said outer sleeve are made of polypropylene, said compression coil spring is made of carbon steel and said pads are made of synthetic rubber.

4. A vibration isolation spring mount as in claim 1, wherein said inner sleeve and said outer sleeve are made of polypropylene, said compression coil spring is made of carbon steel and said pads are made of synthetic rubber.

5. A vibration isolation spring mount as in claim 1 wherein said outer sleeve further comprises a plurality of guide ribs for receiving and maintaining said compression coil spring centered in relation to the axis of said outer sleeve, said guide ribs disposed on an interior surface of said enclosed upper end.

6. A vibration isolation spring mount as in claim 5, wherein said inner sleeve and said outer sleeve are made of polypropylene, said compression coil spring is made of carbon steel and said pads are made of synthetic rubber.

* * * * *

UNITED STATES PATENT AND TRADEMARK OFFICE
CERTIFICATE OF CORRECTION

PATENT NO. : 6,773,000 B2
DATED : August 10, 2004
INVENTOR(S) : Mitsuhiro Oyama

It is certified that error appears in the above-identified patent and that said Letters Patent is hereby corrected as shown below:

Column 2,
Line 29, "numeral 2b" should read -- numeral 2a --;
Line 64, "Opening if" should read -- Opening 1f --.

Signed and Sealed this

Eleventh Day of October, 2005

JON W. DUDAS
*Director of the United States Patent and Trademark Office*